United States Patent
Chalemin et al.

(10) Patent No.: US 8,930,953 B2
(45) Date of Patent: Jan. 6, 2015

(54) DYNAMIC CHECKING OF HARDWARE RESOURCES FOR VIRTUAL ENVIRONMENTS

(75) Inventors: Glen E. Chalemin, Austin, TX (US); Erik A. Kane, San Jose, CA (US); Alfredo V. Mendoza, Georgetown, TX (US); Clifford J. Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1460 days.

(21) Appl. No.: 12/355,091

(22) Filed: Jan. 16, 2009

(65) Prior Publication Data

US 2010/0186010 A1 Jul. 22, 2010

(51) Int. Cl.
*G06F 9/50* (2006.01)
*G06F 9/455* (2006.01)

(52) U.S. Cl.
CPC .............. *G06F 9/45533* (2013.01); *G06F 9/50* (2013.01); *G06F 9/5077* (2013.01); *Y02B 60/142* (2013.01)
USPC .......................................... 718/104; 718/105

(58) Field of Classification Search
CPC ......... G06F 9/52; G06F 9/5016; G06F 9/505; G06F 9/5083; G06F 9/50
USPC ................................. 718/104, 105
See application file for complete search history.

(56) References Cited

U.S. PATENT DOCUMENTS

| | | | | |
|---|---|---|---|---|
| 4,871,930 A | * | 10/1989 | Wong et al. | 326/39 |
| 4,903,223 A | * | 2/1990 | Norman et al. | 326/39 |
| 4,912,342 A | * | 3/1990 | Wong et al. | 326/40 |
| 6,154,778 A | | 11/2000 | Koistinen et al. | |
| 6,721,898 B1 | * | 4/2004 | Hasha | 714/4.3 |
| 6,725,317 B1 | * | 4/2004 | Bouchier et al. | 710/312 |
| 7,140,020 B2 | * | 11/2006 | McCarthy et al. | 718/104 |
| 7,191,446 B2 | * | 3/2007 | Kosanovic | 718/104 |

(Continued)

FOREIGN PATENT DOCUMENTS

JP 07021063 A * 1/1995 ............. G06F 11/34

OTHER PUBLICATIONS

Foster, I., et al., "The Anatomy of the Grid: Enabling Scalable Virtual Organizations," International Journal of High Performance Computing Applications, vol. 15, No. 3, 2001, pp. 200-222.

(Continued)

*Primary Examiner* — Aimee Li
(74) *Attorney, Agent, or Firm* — Stephen R. Tkacs; Stephen J. Walder, Jr.; John D. Flynn

(57) ABSTRACT

Mechanisms that dynamically check availability of hardware resources for applications of virtual environments are provided. One or more computing devices have various hardware resources available to applications of a virtual environment. Hardware resources may comprise, for example, amounts of memory, amounts or units of processing capability of one or more processors, and various types of peripheral devices. The mechanisms store hardware data pertaining to a specified amount of hardware recommended or required for an application to execute within the virtual environment. The mechanisms monitor for changes to the hardware configuration that may affect amount of hardware available to the virtual environment and/or application. If the changes to the hardware reduce the amount of available hardware to a point beyond the specified amount of hardware, the mechanisms prevent the application from being executed or prevent the changes to the hardware configuration.

23 Claims, 9 Drawing Sheets

(56) References Cited

U.S. PATENT DOCUMENTS

| | | | |
|---|---|---|---|
| 7,299,468 B2* | 11/2007 | Casey et al. | 718/104 |
| 7,370,095 B2 | 5/2008 | Sauvage et al. | |
| 7,730,486 B2* | 6/2010 | Herington | 718/1 |
| 8,078,728 B1* | 12/2011 | Pollan et al. | 709/226 |
| 8,621,458 B2* | 12/2013 | Traut et al. | 718/1 |
| 2002/0166117 A1* | 11/2002 | Abrams et al. | 717/177 |
| 2005/0155033 A1 | 7/2005 | Luoffo et al. | |
| 2006/0045039 A1* | 3/2006 | Tsuneya et al. | 370/318 |
| 2006/0059492 A1* | 3/2006 | Fellenstein et al. | 718/104 |
| 2006/0136653 A1* | 6/2006 | Traut et al. | 711/6 |
| 2006/0195715 A1* | 8/2006 | Herington | 714/4 |
| 2007/0078988 A1* | 4/2007 | Miloushev et al. | 709/227 |
| 2007/0157201 A1* | 7/2007 | Schmidt et al. | 718/100 |
| 2007/0203684 A1 | 8/2007 | Van Egeren et al. | |
| 2007/0226341 A1 | 9/2007 | Mateo | |
| 2008/0072229 A1* | 3/2008 | Kirton et al. | 718/104 |
| 2008/0244607 A1* | 10/2008 | Rysin et al. | 718/104 |
| 2009/0157870 A1* | 6/2009 | Nakadai | 709/224 |
| 2010/0146515 A1* | 6/2010 | Shpigelman | 718/104 |

OTHER PUBLICATIONS

Marton, A., et al., "Service Provision and Composition in Virtual Business Communities," 1999 Proceedings of the 18$^{th}$ IEEE Symposium on Reliable Distributed Systems, Oct. 1999, pp. 6.

* cited by examiner

LEGEND: ▒ – HARDWARE CHANGE   ■ – VIRT. CHANGE OF H/W ACCESS   ▓ – LOW POWER STATE

DYNAMIC CHECKING OF HARDWARE RESOURCES FOR VIRTUAL ENVIRONMENTS

TECHNICAL FIELD

The present disclosure relates generally to virtualization software and computing devices and more particularly to dynamically checking availability of hardware resources for applications of virtual environments.

BACKGROUND

Common types of computing devices are desktop computers and server systems. Virtualization software virtualizes underlying hardware resources of a computing device so that an operating system and applications that run in a virtual machine only see virtual system resources that the virtualization software makes available to the virtual machine. Hardware resources made available to applications running in a virtual machine, or virtual environment, may be a portion of the host system resources that are allocated to the virtual environment, such as a portion of the host memory, for example. Alternatively, some virtual system resources may be emulated virtual system resources that do not directly correspond with host system resources, such as a physical USB (Universal Serial Bus) port, with a connected USB flash memory device, being emulated as an attached SCSI (Small Computer System Interface) hard drive, for example.

Multiple virtual environments may execute on a single computing device, or host system. One or more thin layers of software may operate between each virtual environment and the underlying host system hardware. In many implementations, this software is referred to as a hypervisor, or more generically as a virtual machine monitor (VMM). The individual virtual environments are separated into logical partitions, each logical partition being isolated from other logical partitions. The underlying hardware resources may include, for example, a number of input/output (I/O) adapters, portions of processor computational resources from one or more processors, random access memory, and hard disk drives.

Computer applications that may execute within a virtual environment usually have some minimum hardware resource requirements. Such hardware resource requirements are usually specified by the software company that creates the application. Frequently the application is only certified by the software company or developer to run with that minimum set of hardware resources, since that is the minimum hardware resources that the software company or developer used to run their system product tests.

The system administrator who may need to create or modify a virtualized environment may not always be aware of the specific needs, or the amount of hardware resources recommended for all of the individual applications to be executed within the virtual environment. Further, an application may be installed in an existing virtual environment, wherein the requirements of the later-installed application may exceed the resources available to the existing environment. In other cases, the system administrator may make changes to the resources available to a virtualization environment. For example, the system administrator may dynamically change the logical partitioning of the virtual environment, reducing the available resources in the environment below the minimum amount required by, or specified for, the applications that are currently executing within the environment.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Generally speaking, methods, apparatuses, and computer program products to dynamically check availability of hardware resources for applications of virtual environments are contemplated. Various embodiments comprise one or more computing devices, such as one or more servers, having various hardware resources available to applications of a virtual environment. Hardware resources may comprise, for example, amounts of memory, amounts or units of processing capability of one or more processors, and various types of peripheral devices. The embodiments may store hardware data pertaining to a specified amount of hardware recommended or required for an application to execute within the virtual environment. The embodiments may generally monitor for changes to the hardware configuration, which may affect amount of hardware available to the virtual environment and/or application. If the changes to the hardware reduce the amount of available hardware to a point beyond the specified amount of hardware, the embodiments may prevent the application from being executed or prevent the changes to the hardware configuration.

Some embodiments comprise a method that includes storing hardware data for an application of a virtual environment. The hardware data may comprise an amount of a hardware resource specified to enable execution of the application in the virtual environment, such as an amount of processor computing capability, an amount of memory, or an amount of peripheral devices available to the virtual environment. The embodiments may automatically compare the hardware data with the hardware resources to be available for the application upon a change of configuration. If the comparison reveals that the amount of the hardware resource available upon the change of configuration satisfies the amount of a hardware resource specified for the application, the embodiments may enable execution of the application.

Further embodiments comprise apparatuses having a hardware specification module to specify an amount of a hardware resource to be available for an application of a virtual environment and a hardware resource monitor to monitor for changes of configuration to hardware resources of the apparatus. The embodiments also have an execution control module to control execution of the application. The execution control module may prevent execution of the application if the hardware resource monitor detects that a change affects the availability of the amount of the hardware resource.

Further embodiments comprise a computer program product of a computer readable storage medium including instructions that, when executed by a processor, receive hardware data for an application of a virtual environment. For example, the hardware data may list hardware resources which enable the application to execute. The storage medium further includes instructions that compare the hardware data with a current configuration of hardware resources available to a computing device and enable the application to execute based on the comparison.

An even further embodiment comprises a method for deploying computing infrastructure. The method comprises integrating a computer program product into a computing system, with the computer program product comprises instructions that, when executed by a processor, receive hardware data for an application of a virtual environment. For example, the hardware data may list hardware resources which enable the application to execute. The computer program product further includes instructions that compare the hardware data with a current configuration of hardware resources available to a computing device and enable the application to execute based on the comparison.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

In many of the following paragraphs, numerous embodiments are discussed using the terms "client" and "server". The term "computing device" is also used. The term "server" may refer to a computer or device on a network that manages network resources. Clients may generally be thought of as a computer, device, or a computer application being executed by a computer system that accesses the services provided by server applications and dedicated server computers. However, in several instances in the discussion these terms are interchangeable. Accordingly, one should not conclude that a discussion that uses only "client" or "server" terms, as opposed to using "computer" or "computer systems" terms, is meant to limit the discussion to one term or the other. One of ordinary skill in the art will recognize that such variations may be substituted for the described embodiments, and employed in accordance with similar constraints, to perform substantially equivalent functions.

Figure 1:
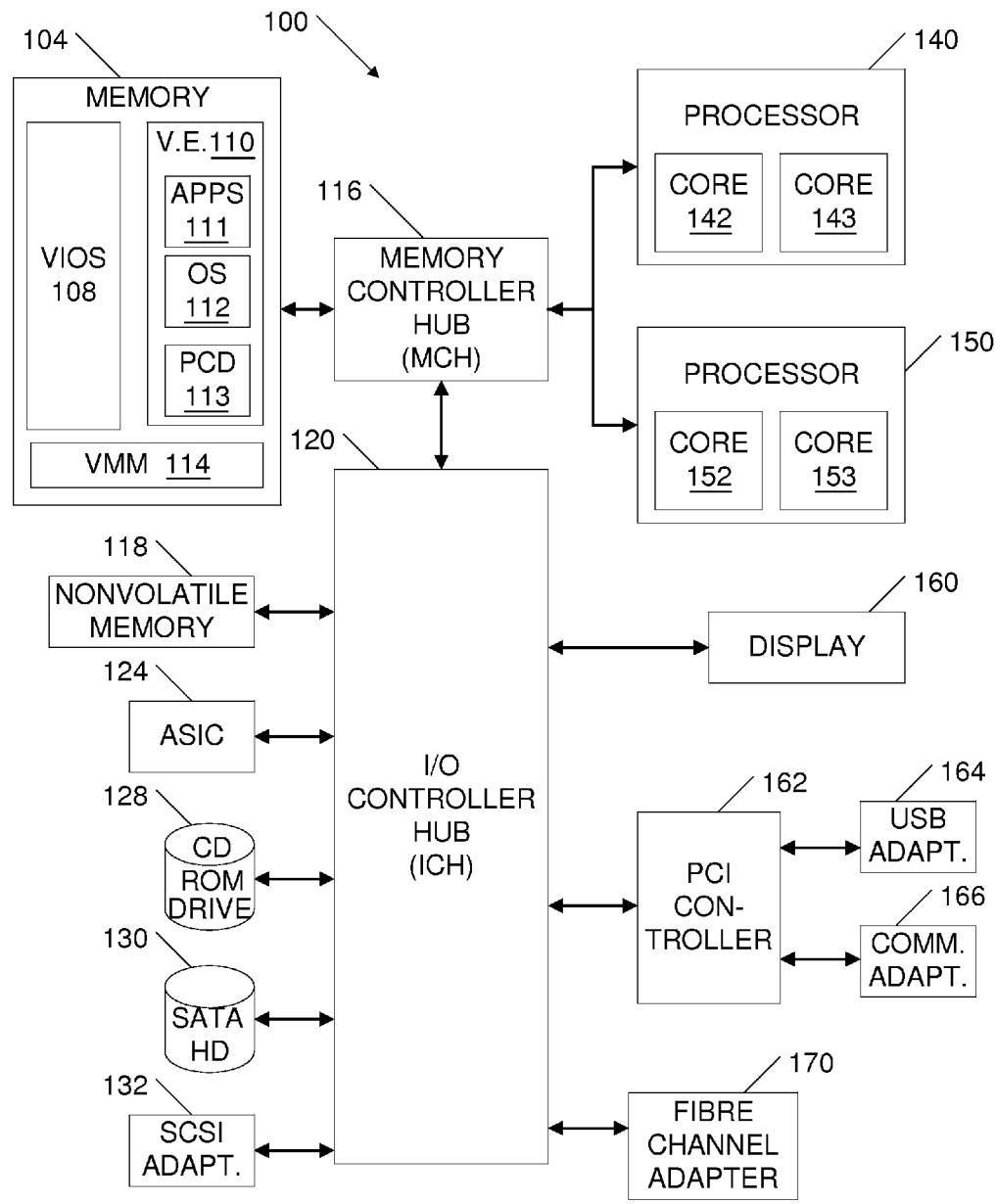
FIG. 1 depicts an embodiment of a system that may dynamically check availability of hardware resources for applications of virtual environments, comprising two processors, a virtual machine monitor, a display, and various input-output devices.

Turning now to the drawings, FIG. 1 depicts a system 100 with two processors, 140 and 150, a memory controller hub (MCH) 116, memory 104, and an I/O controller hub (ICH) 120. In numerous embodiments system 100 may comprise a server. In other embodiments system 100 may comprise a different type of computing device, such as a mainframe computer or part of a mainframe computer system, a desktop computer, or a notebook computer. As will be illustrated, system 100 may employ a profile check daemon 113 that dynamically checks availability of hardware resources for applications 111 of virtual environment 110.

As depicted in FIG. 1, system 100 may execute a number of applications, such as applications 111, in one or more virtual environments of memory 104, such as virtual environment 110. For example, system 100 may comprise part of a larger server system, such as a computing board, or blade server, in a rack-mount server. Processors 140 and 150 may execute operating instructions for programs and applications 111 executed by users of system 100. Applications 111 may comprise, e.g., a network mail program and several productivity applications, such as a word processing application and a computer aided design (CAD) application.

Processors 140 and 150 may have a number of cores, such as cores 142, 143, 152, and 153, which may be coupled with cache memory elements of processors 140 and 150. For example, processor 150 may have cores 152 and 153 coupled with internal processor cache memory. The number of processors and the number of cores may vary from embodiment and embodiment. For example, while system 100 has two processors, 140 and 150, alternative embodiments may have other numbers of processors, such as one, four, eight, or some other number. The number of cores of a processor may also vary in different embodiments, such as one core, four cores, five cores, or some other number of cores.

The number of processors, the number of cores, and/or the number of processing units represented by portions of computing capability of the cores may each represent an amount of a hardware resource specified for execution of an application of applications 111. For example, one application of applications 111 may comprise a CAD program developed by a CAD software company. The CAD software company may specify that the CAD program requires at least one single core processor, with a rated benchmark performance rating of 4000 million instructions per second (MIPs), and a suggested core cache size of 512 kilobytes (KB).

Processors 140 and 150 may execute the instructions in memory 104 by interacting with MCH 116. The types of memory devices comprising memory 104 may vary in different embodiments. In some embodiments, memory 104 may comprise volatile memory elements, such as four 4-gigabyte (GB) dynamic random access memory (DRAM) sticks. Some embodiments may comprise smaller or larger amounts of memory. For example, some embodiments may comprise 128 GB of RAM, while other embodiments may comprise even more memory, such as 512 GB. In alternative embodiments, memory 104 may comprise nonvolatile memory. For example in some embodiments memory 104 may comprise a flash memory module, such as a 64 GB flash memory module. In numerous embodiments, an application of applications 111 may have a specified minimum amount of available RAM required or suggested to execute the application properly. In other words, the amount of memory available to an application may comprise one amount of a hardware resource specified to execute the application.

Also as depicted in FIG. 1, system 100 may have a virtual machine monitor 114, such as a hypervisor, that manages one or more virtual machines, such as virtual environment 110 and virtual I/O server 108. In other words, virtual machine monitor 114 may allow multiple operating systems to simultaneously execute via system 100. In the embodiment of FIG. 1, virtual machine monitor 114 may comprise an application loaded into memory 104, separate from any operating system.

In different embodiments, virtual machine monitor 114 may exist in different forms. For example, in one embodiment virtual machine monitor 114 may comprise firmware coupled to processor 140 and processor 150. In another embodiment, virtual machine monitor 114 may comprise a software application loaded as part of or after an operating system. That is to say, virtual machine monitor 114 may comprise an application being executed by an operating system. In an even further embodiment, virtual machine monitor 114 may comprise a hardware device, such as a state machine or an application-specific integrated circuit (ASIC) device, such as ASIC 124. Some embodiments may have no separate virtual machine monitor, in which case the operating system may perform the functions of a virtual machine monitor or hypervisor. The number of virtual machines may also vary from embodiment to embodiment.

Virtual environment 110 and virtual I/O server 108 may each comprise collections of software programs that form self-contained virtual machines. Virtual environment 110 and virtual I/O server 108 may operate independently of, but in conjunction with, virtual machine monitor 114. For example, virtual I/O server 108 may work in conjunction with virtual machine monitor 114 to allow virtual environment 110 and other virtual clients to interact with various physical I/O hardware elements or resources.

ICH 120 may allow processors 140 and 150 to interact with external peripheral devices, such as keyboards, scanners, and data storage devices. Consequently, programs and applications being executed by processors 140 and 150 may interact with the external peripheral devices. For example, processors 140 and 150 may present information to a user via a display 160 coupled to, e.g., an Advanced Graphics Port (AGP) video card. The type of console or display device may be a cathode-ray tube (CRT) monitor, a liquid crystal display (LCD) screen, or a thin-film transistor flat panel monitor, as examples. The type of console or display device may comprise another hardware resource specified for the execution of an application of applications 111. For example, the application may require at least one display device capable of generating a resolution of 1024×768, non-interlaced, with a response time of 5 milliseconds (ms).

Display 160 may allow a user to view and interact with applications 111. For example, display 160 may allow the user to execute a CAD program of applications 111 and store drawing information to a storage area network coupled to system 100 via a fibre channel adapter 170. Alternative embodiments of system 100 may comprise numerous fibre channel adapters 170. Additionally, in some embodiments, the user or a system administrator may also use display 160 to view and dynamically change configuration information of virtual machine monitor 114, virtual I/O server 108, and virtual environment 110. For example, the system administrator may change partitioning information for numerous virtual machines to be managed by virtual machine monitor 114. Profile check daemon 113 may receive an event notification in response to one or more of the changes proposed by the system administrator. Profile check daemon 113 may compare the hardware resources that will be available to various applications of applications 111 after the changes are implemented. If the resulting changes are insufficient to enable one or more of the applications to execute, system 100 may prevent the proposed changes from being made or, alternatively, allow the changes but generate a warning or error message.

In various embodiments, ICH 120 may allow applications 111, executed via processors 140 and 150, to interact with various hardware devices. System 100 may allow applications 111 to transfer data between memory 104 and one or more devices coupled to ICH 120 or transfer data between two or more devices coupled to ICH 120. In various embodiments, ICH 120 may allow applications 111 to store and retrieve data from one or more universal serial bus (USB) devices via Peripheral Component Interconnect (PCI) controller 162 and a USB device coupled to USB adapter 164. For example, in one embodiment, virtual environment 110 may be configured to store and/or retrieve information via virtual I/O server 108, virtual machine monitor 114, and a primary USB hard drive coupled with USB adapter 164. The USB hard drive, or a different type of USB device, may comprise another hardware resource specified for execution of an application of applications 111. For example, the application may require at least one USB hard drive.

Applications 111, via execution of processors 140 and 150, may also send and receive data by way of PCI controller 162 and communication adapter 166. Communication adapter 166 may comprise, e.g., a network interface card (NIC). In one embodiment, system 100 may allow one or more executing applications 111 to transfer data between virtual environment 110 and a hard disk of an Internet Small Computer Systems Interface (iSCSI) storage area network (SAN). For example, system 100 may have several virtual clients situated in one or more logical partitions (LPARs). Virtual environment 110 may reside in one logical partition and virtual I/O server 108 may reside in a second logical partition. System 100 may enable virtual environment 110 to communicate with and transfer information to/from the iSCSI hard disk using virtual I/O server 108 and communication adapter 166. Communication adapter 166 and the iSCSI hard disk may each comprise a hardware resource specified for execution of an application of applications 111. For example, the application may require at least one wireless Ethernet card capable of transferring data at a rate of 108 megabits per second (Mbps).

In addition to USB adapter 164 and communication adapter 166, ICH 120 may also allow applications 111 of system 100 to interact with Advanced Technology Attachment (ATA) devices, such as ATA hard drives, digital versatile disc (DVD) drives, and compact disc (CD) drives, like CD read only memory (ROM) drive 128. As shown in FIG. 1, system 100 may have a Serial ATA (SATA) drive, such as SATA hard drive 130. SATA hard drive 130 may be used, e.g., to store numerous operating systems for various virtual environments, device drivers, and application software for virtual clients of system 100. For example, SATA hard drive 130 may store AIX®, Linux®, Macintosh® OS X, Windows®, or some other operating system that system 100 loads into one or more LPARs. SATA hard drive 130, CD ROM drive 128, and other SATA or parallel ATA devices may all comprise hardware resources specified for execution of an application of applications 111. Such operating systems may be separately loaded into virtual environments, such as operating system 112 of virtual environment 110.

In various embodiments, ICH 120 may allow applications in partitions managed by virtual machine monitor 114 to store and retrieve information in nonvolatile memory 118, as well as interact with ASIC 124. For example, nonvolatile memory 118 may comprise flash memory in some embodiments while comprising programmable read-only memory (PROM) or another type of memory in other embodiments. Nonvolatile memory may be used, e.g., to store data for applications 111. ICH 120 may also allow applications in partitions managed by virtual machine monitor 114 to store and retrieve data using a SCSI device coupled to SCSI adapter 132. The type and amount of memory of nonvolatile memory 118, the type of ASIC 124, and the type and/or number of SCSI devices attached to SCSI adapter 132 may all comprise a hardware resources specified for execution of an application of applications 111.

Alternative embodiments may also dynamically check availability of hardware resources for applications of virtual environments in a system 100 having different types of hardware not depicted in FIG. 1, such as a sound card, a scanner, and a printer, as examples. Conversely, in different embodiments, system 100 may not comprise all of the elements illustrated for the embodiment shown in FIG. 1. For example, some embodiments of system 100 may not comprise one or more of SCSI adapter 132, PCI controller 162, USB adapter 164, CD-ROM drive 128, and ASIC 124.

Worth noting, FIG. 1 depicts profile check daemon 113 as an element of virtual environment 110, separate from operating system 112. In many embodiments, profile check daemon 113 may comprise an element of operating system 112. In other words, FIG. 1 would depict profile check daemon 113 as a sub-element of operating system 112, not separate from operating system 112. In other alternative embodiments, profile check daemon may not reside in virtual environment 110. For example, in some embodiments, profile check daemon 113 may comprise an element of virtual machine monitor 114.

Figure 2A:
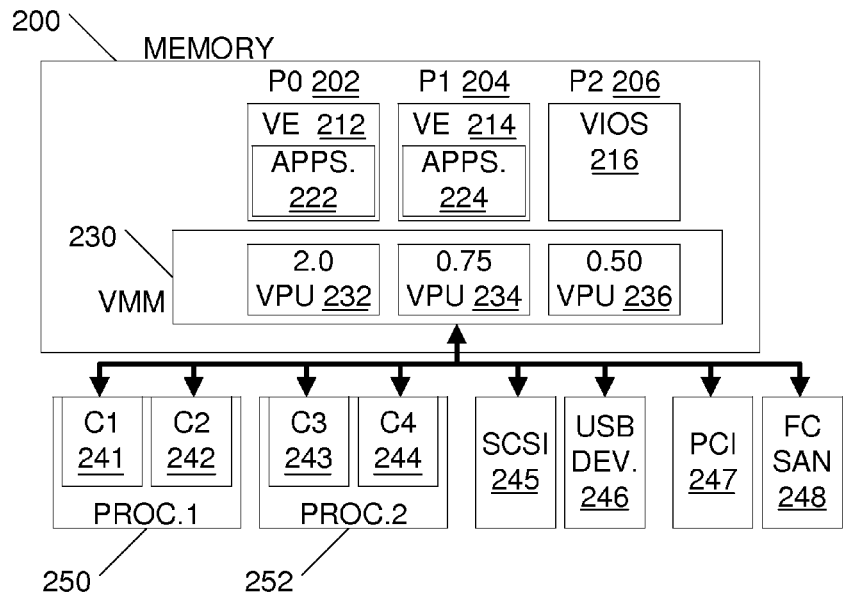
FIGS. 2A & 2B illustrate how various changes of hardware resources for a computing device or apparatus may affect the availability of the hardware resources for applications of virtual environments.
Figure 2B:
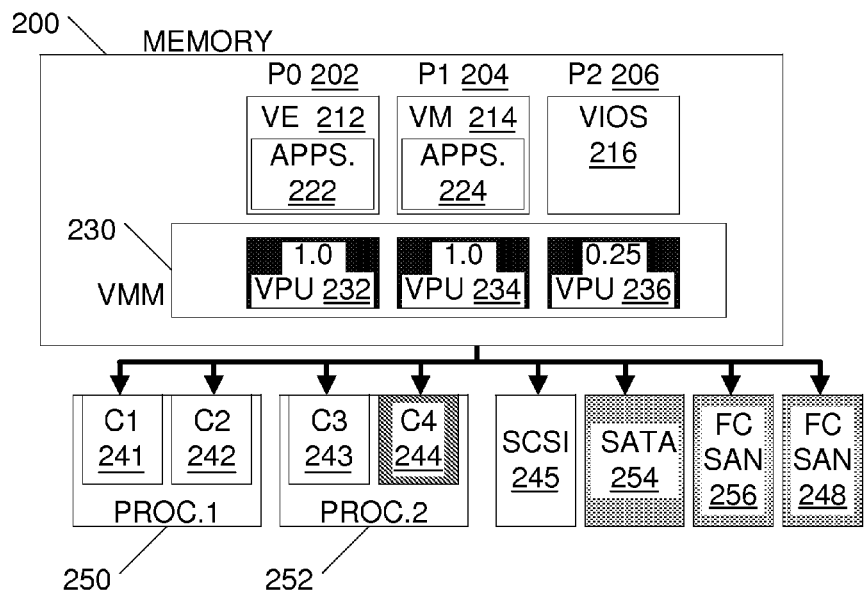

To provide a more detailed illustration of how a system or an apparatus may dynamically monitor hardware resources for virtual applications, we turn now to FIGS. 2A and 2B. FIGS. 2A and 2B illustrate how various changes of hardware resources for a computing device or apparatus may affect the availability of the hardware resources for applications of virtual environments. For example, memory 200 may comprise memory of an apparatus or a system, such as memory 104 of system 100 in FIG. 1. Virtual machine monitor 230 and processors 250 and 252 may correspond to virtual machine monitor 114 and processors 140 and 150, respectively. Similarly, virtual environments 212 and 214 may correspond to virtual environment 110 and an additional virtual environment not depicted in FIG. 1, while virtual I/O server 216 may correspond to virtual I/O server 108. As noted before, the number of processors, the number of cores, and the number of virtual machines may vary from embodiment to embodiment.

Processors 250 and 252 may comprise physical processors. In an embodiment, each processor may have a plurality of cores. In the embodiment of FIGS. 2A and 2B, each processor has two cores. Processor 250 has cores 241 and 242; processor 252 has cores 243 and 244. Processors 250 and 252 may comprise a shared processor pool. The shared processing pool may allow a system or apparatus to assign partial processors to a virtual environment of a logical partition. In other words, a system may hold physical processors 250 and 252 in a shared processing pool and share processors 250 and 252, as well as the cores of the processors, among numerous virtual environments in separate logical partitions. In FIG. 2A, for example, a system may share processors 250 and 252 among partitions 202, 204, and 206.

In an embodiment, the available processing power may be conceptualized as being spread equally across virtual processors. The specific number of virtual processors assigned to a virtual environment or virtual machine may depend on the workload of the virtual machine. In the embodiment of FIG. 2A, the system has 2 physical processors in the shared pool, specifically processors 250 and 252. The 2 physical processors have 4 cores 241-244 which may provide a total of 4.00 virtual processing units.

Virtual machine monitor 230 may distribute the processing power among the three logical partitions, partitions 202, 204, and 206, in the manner illustrated in FIG. 2A. Partition 202 has access to 2.00 processing units and 2 virtual processors (element 232); partition 204 has access to 0.75 processing units and 1 virtual processor (element 234); and partition 206 has 0.50 processing units and 1 virtual processor (element 236). Additionally, either of virtual environments 212 and 214 may be configured to access the physical devices coupled to the system, such as SCSI 245, USB device 246, PCI device 247, and fibre channel SAN 248. The processing units and the physical devices may comprise hardware resources that may be specified for the execution of one or more of applications 222 and 224.

As the system of FIG. 2A operates, the demand or total load may increase and decrease with the passage of time. FIG. 2A may represent a configuration of virtual processing units mapped for a specific load of the system at one instance in time. An administrator may decide to alter the configuration if the loads of the virtual environments change. Alternatively, in another embodiment, the system may periodically measure or determine the total load of the system after specific intervals or units of time, such as once every 5 seconds, and attempt to make dynamic changes to the configuration. For example, virtual machine monitor 230 may detect that core 244 of processor 252 is lightly loaded and is a candidate for switching to a low-power state to conserve energy.

In performing dynamic core pool management, virtual machine monitor 230 may change, or attempt to change, the mapping of virtual processors and virtual processing units to different processor cores. In changing the mapping of the virtual processing units, virtual machine monitor 230 may consolidate the virtual processors onto a smaller number of processor cores and reduce the size of the core pool during times of light loading. Virtual machine monitor 230 may also attempt to change the mapping of virtual processing units to spread them out over a larger number of cores and hardware threads when activating and adding cores to the core pool during periods of heavy demand. As illustrated in FIG. 2B, virtual machine monitor 230 may attempt to change the mapping of the virtual processing units among the logical partitions 202, 204, and 206 to 1.0, 1.0, and 0.25, respectively. Consequently, virtual machine monitor 230 may attempt to reduce the number of virtual processors from 4 to 3, and remap the virtual processing units from core 244, packing the virtual processing units onto cores 241-243.

In attempting to change the mapping of the virtual processing units among the logical partitions, virtual machine monitor 230 may attempt to reduce the amount of virtual processing units specified for application. For example, an application of applications 222 may be specified to require no less than two virtual processing units. Consequently, the system may detect that the proposed reduction of the amount of virtual processing units (element 232) from 2.0 to 1.0 for partition 202 would result in the application not having sufficient virtual processing units. In other words, the number of virtual processing units that would result from the change would be less than the amount of virtual processing units specified for the application. In response, the system may prevent the virtual machine monitor 230 from completing the change. In the alternative scenario where the administrator may attempt to make the same change, the system may also prevent the administrator from making the change.

Alternatively, in another embodiment, the system may permit the change to the amount of virtual processing units in order to conserve power. In such an alternative embodiment, however, the system may detect the unavailability of the amount of the specified hardware resource and prevent execution of the application. If virtual machine monitor 230 is configured to dynamically manage the virtual processing units allotted to each of the LPARs, the system may temporarily prevent execution of the application until virtual machine monitor 230 reconfigures virtual processing units (element 232) from 1.0 to 2.0 for partition 202.

Aside from the amount of virtual processing units, a virtual environment and/or an application of the virtual environment may be configured to access other hardware resources. As noted above, the embodiment depicted in FIG. 2A has hardware resources of SCSI 245, USB device 246, PCI device 247, and fibre channel SAN 248. Virtual environment 212 and/or virtual environment 214 may be configured to access one or more of the hardware resources of SCSI 245, USB device 246, PCI device 247, and fibre channel SAN 248. A virtual environment may be configured to access a hardware resource exclusively, such as by way of a dedicated hardware resource. Alternatively, a virtual environment may be configured to access a hardware resource in a shared fashion, such as by way of virtual I/O server 216. In other words, virtual environment may share access to one or more hardware resources via virtual I/O server 216.

In the embodiment of FIG. 2A, an application of applications 222 may be specified to require the availability of USB device 246 or PCI device 247. Additionally, an application of applications 224 may be specified to require the availability of a storage device of fibre channel SAN 248. An administrator may attempt to change the configuration of the system from the arrangement shown in FIG. 2A to the arrangement shown in FIG. 2B. For example, the administrator may use a hardware management console to replace USB device 246 with SATA hard drive 254 and PCI device 247 with fibre channel SAN 256. Because the application of applications 222 is specified to require the availability of USB device 246 or PCI device 247, and the proposed change of configuration to the hardware resources would remove both USB device 246 and PCI device 247, the system may prevent administrator for making such a change. For example, the system may generate an error, provide the administrator with information as to why the change is impermissible, and allow the administrator to make an alternative change to the hardware resources.

FIG. 2B illustrates that fibre channel SAN 248, while not removed from the system due to a configuration change, may nonetheless experience a hardware change. For example, a storage device of the SAN may fail or otherwise be taken offline. Alternatively, a maintenance technician may perform maintenance on the fibre channel host bus adapter by hot swapping the card with a replacement. In either of the scenarios, which involve a hardware change that may not be controlled by the system, the system may nonetheless be configured to monitor for such a hardware change. Upon detecting a change of the available hardware resources, the system may compare the hardware resources specified for applications 222 and 224 with the currently available hardware resources after the change. If the system detects that a hardware resource specified for an application is no longer available after the change, the system may prevent the application from starting up. Continuing with the example above, the system may prevent the execution of the application of applications 224 that requires the availability of the storage device of fibre channel SAN 248. Alternatively, if the application is currently executing, the system may stop the application and prevent the application from restarting until the device of fibre channel SAN 248 becomes available. Further, in an alternative embodiment, the system may also generate an error message related to the change of the hardware resource.

Figure 3:
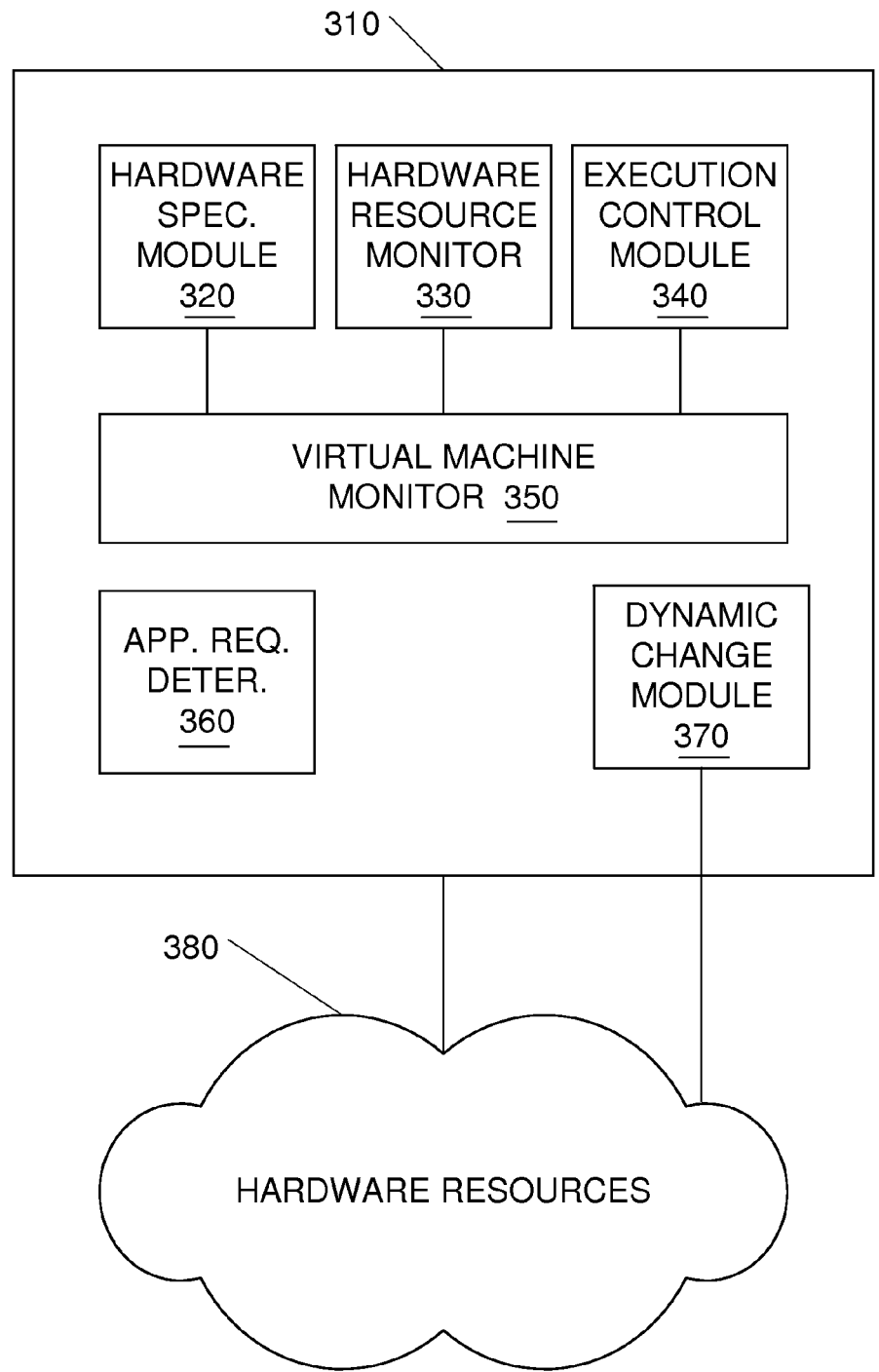
FIG. 3 depicts one embodiment of an apparatus that may dynamically check availability of hardware resources for applications of virtual environments, having a hardware specification module, a hardware resource monitor, and an execution control module.

FIG. 3 depicts one embodiment of an apparatus 310 that may dynamically check availability of one or more hardware resources for applications of virtual environments. One or more elements of apparatus 310 may be in the form of hardware, software, or a combination of both hardware and software. For example, in the embodiment depicted in FIG. 3, the modules of apparatus 310 may exist as instruction-coded modules stored in a memory device. For example, the modules may comprise software or firmware instructions of an application, executed by one or more processors. In other words, apparatus 310 may comprise elements of a computing device coupled to hardware resources 380.

In alternative embodiments, one or more of the modules of apparatus 310 may comprise hardware-only modules. For example, hardware resource monitor 330 may comprise a portion of an integrated circuit chip coupled with processors of a computing device, in an arrangement different than that shown in FIG. 3. In such embodiments, hardware resource monitor 330 may work in conjunction with virtual machine monitor 350, monitoring hardware resources 380 for configuration changes. In even further alternative embodiments, one or more of the modules of apparatus 310 may comprise a combination of hardware and software modules. For example, virtual machine monitor 350 may comprise firmware and a standalone processing circuit that performs the monitoring and management of virtual environments and logical partitions in memory, enabling the environments and partitions to access I/O hardware.

Hardware specification module 320 may specify an amount of a hardware resource to be available for an application of a virtual environment. For example, hardware specification module 320 may comprise an application resource profile file, or a configuration file, containing a list of various hardware resources required or suggested to be available for the execution of an application or applications. The software manufacturer that created or developed an application may have tested the application in various hardware settings and determined the various hardware resources required to execute the application.

The software manufacturer may store a data list of the required hardware resources, or alternatively the suggested hardware resources, in a virtualization hardware resource file on the CD or DVD containing the application which is shipped to the software customer. The hardware data of the required or suggested hardware resources may be installed in hardware specification module 320 whenever the application is installed for the virtual environment and may be removed from hardware specification module 320 whenever the application is uninstalled. For example, the hardware data of hardware specification module 320 may be stored in as one or more designated application resource profile files, in known or established system locations, containing the hardware requirements for all virtual applications. The hardware data may constitute a line or a section in the application resource profile file. As a specific illustration, in one embodiment the application resource profile file may have the filename "vahw.cfg", stored in the "/etc/" subdirectory of an AIX® system.

In alternative embodiments, the specified hardware resources for executing an application may not be stored in one common file. Such alternative embodiments may employ numerous hardware specification modules. Each application may have a separate file that lists the specified hardware resources for execution of the application. In such alternative embodiments, the filename for each application may again have the filename "vahw.cfg", but be stored in a directory dedicated or reserved for the individual application. For example, the "vahw.cfg" may be stored in a hidden ".application" subdirectory under the root directory ("/").

Hardware resource monitor 330 may work in conjunction with hardware specification module 320 and execution control module 340 to detect changes of hardware resources and control the execution of applications affected by the changes. For example, in one or more embodiments hardware resource monitor 330 may comprise a profile check daemon as a component of the operating system in the virtual environment, such as a component of operating system 112 in virtual environment 110 of FIG. 1. Further, execution control module 340 may comprise an application loader of the operating system. During startup of an application in the logical partition, the operating system application loader may verify that the hardware resources specified to execute the application are available. The application loader may first determine what the specified hardware resources are. The application loader may then check or compare the specified hardware resources against the currently available resources of the virtual environment to make sure sufficient resources are available to meet or exceed the specified hardware resources. If the specified hardware resources are not met, the application may prevent the application from loading and starting.

In embodiments comprising a profile check daemon, the daemon may receive an event notification whenever the system or a person attempts to make a dynamic configuration change to the virtual environment. In response to receiving the event notification, the profile check daemon may check the specified hardware resources for one or more of the applications listed in the designated application resource profile file(s). If the change would resolve to a configuration which does not provide adequate or sufficient hardware resources to satisfy or exceed the specified hardware resources for executing the applications, the profile check daemon may return a negative/failure response to the dynamic call for the configuration change.

As illustrated above, some embodiments may have hardware resource monitor 330 and execution control module 340 comprise a profile check daemon and an application loader, respectively, which operate in the manner illustrated. In alternative embodiments, hardware resource monitor 330 and/or execution control module 340 may operate differently. For example, in many embodiments hardware resource monitor 330 may detect all changes in the configuration of hardware resources. Hardware resource monitor 330 may compare the specified hardware resources in hardware specification module 320 with the currently available hardware resources each time an application is started in a virtual environment. Additionally, hardware resource monitor 330 may detect dynamic changes of the available hardware resources and, upon detecting a change, hardware resource monitor 330 may determine whether sufficient hardware resources are available to execute one or more of the applications having specified hardware resources listed in hardware specification module 320. Upon detecting that the dynamic change leaves insufficient hardware resources available to execute an application, hardware resource monitor 330 may flag the application as having insufficient hardware resources to execute. If the system or a user attempts to execute the flag application, execution control module 340 may detect the flag and prevent the application from starting.

Virtual machine monitor 350 may enable multiple virtual environments to access hardware resources of hardware resources 380. For example, virtual machine monitor 350 may correspond virtual machine monitor 230, enabling virtual environments 212 and 214, as well as virtual I/O server 216, to access SCSI 245, USB device 246, PCI device 247, and fibre channel SAN 248. In some embodiments virtual machine monitor 350 may comprise software coded instructions executed in volatile memory, such as when apparatus 310 comprises part of a system having software partitioning. In other embodiments virtual machine monitor 350 may comprise firmware coded instructions executed in nonvolatile memory, such as when apparatus 310 comprises part of a system having logical partitioning.

Some embodiments may comprise a dynamic change module 370. For example, dynamic change module 370 may comprise software and/or hardware that enables a system administrator to make dynamic changes to the configuration of hardware resources of the system. As a more specific example, dynamic change module 370 may comprise software instructions in volatile memory that work in conjunction with a hardware management console. Using the hardware management console, the system administrator may make such a dynamic changes as reallocating memory for virtual environments, reallocating storage devices for virtual environments, reallocating amounts of processing capabilities for virtual environments, and reallocation of network indication devices for virtual environments. Dynamic change module 370 may make hardware resource monitor 330 aware of the proposed or implemented changes to the hardware resources. In response to being alerted to the proposed or implemented changes, hardware resource monitor 330 may work in conjunction with hardware specification module 320 and execution control module 340 to prevent or stop execution of applications that may be affected by the proposed or implemented changes to the hardware resources.

Further embodiments may comprise an application requirement determiner 360. For example, a system administrator may desire to load a legacy application having no known specified hardware resources suggested or required for proper execution. In such embodiments, application requirement determiner 360 may monitor the execution of the application in the virtual environment, tracking the usage of hardware resources by the application. Upon tracking the usage for a period of time, application requirement determiner 360 may develop a suggested hardware resource profile for the application and update hardware specification module 320 with an entry for the application. Additionally, in even further embodiments, application requirement determiner 360 may monitor or track the usage of hardware resources by applications that do have specified hardware resources. If the application requirement determiner 360 determines that the application routinely accesses hardware resources which exceed the specified hardware resources for the application, application requirement determiner 360 may update the corresponding entry in hardware specification module 320.

Updating entries in hardware specification module 320 may allow apparatus 310 to improve overall system performance.

As noted, the number of modules in an embodiment of apparatus 310 may vary. Some embodiments may have fewer modules than those module depicted in FIG. 3. For example, one embodiment may integrate the functions described and/or performed by hardware resource monitor 330 with the functions of execution control module 340 into a single module. Further embodiments may include more modules or elements than the ones shown in FIG. 3. For example, alternative embodiments may include two or more hardware specification modules and two or more execution control modules.

In many embodiments, the modules of apparatus 310 may reside in a single memory device, such as a single DRAM stick. In other embodiments, apparatus 310 may reside in more than one memory device. For example one or more modules of apparatus 310 may be spread among multiple servers in a server system. In other words, modules of apparatus 310 may reside on a single server in some embodiments or on multiple servers in alternative embodiments.

Figure 4:
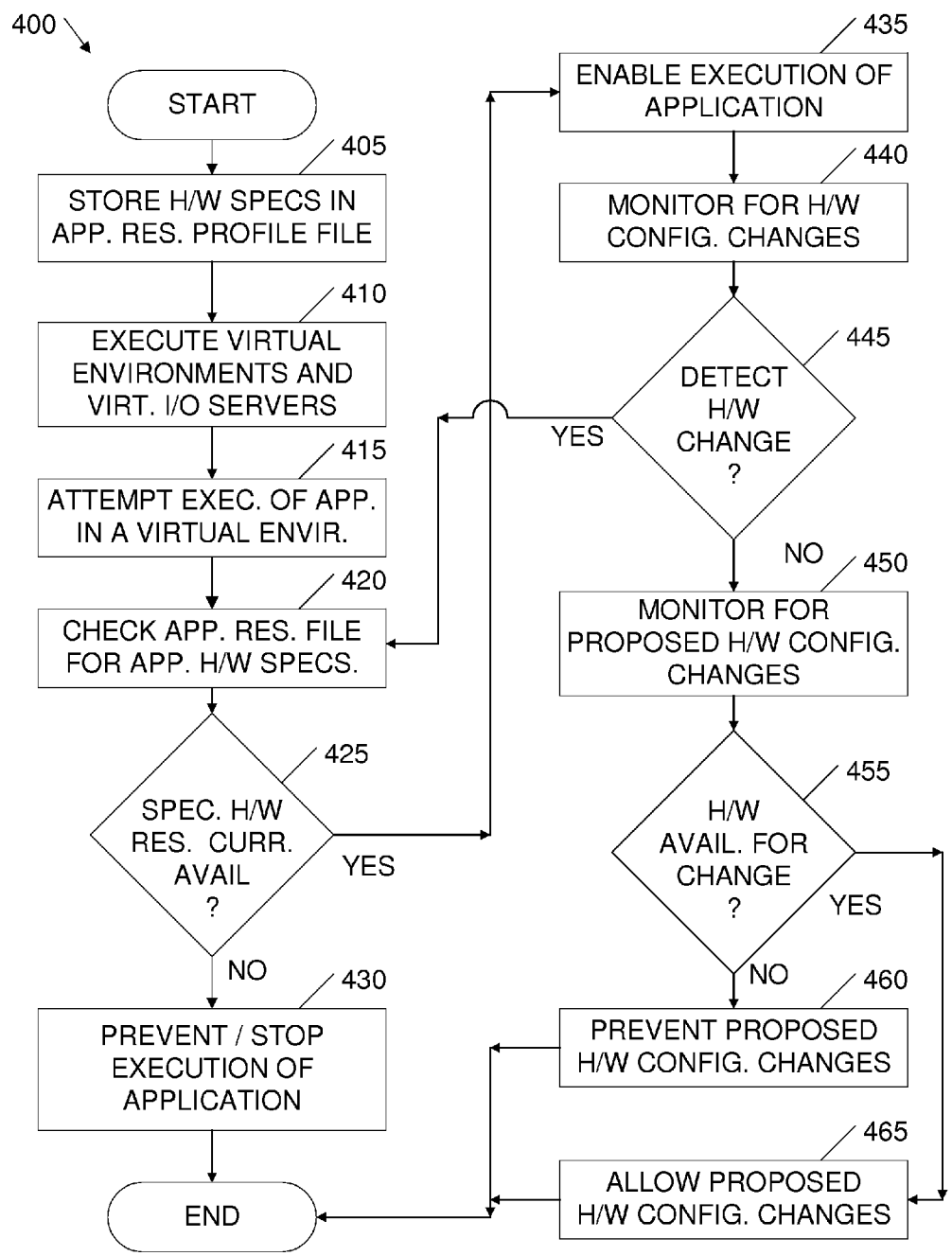
FIG. 4 depicts a flowchart illustrating how an embodiment may execute virtual environments, attempt execution of an application in one of the virtual environments, determine whether required hardware is available to execute the application in the virtual environment, and prevent or enable execution of the application based on the hardware resource availability.

FIG. 4 depicts a flowchart 400 of a process illustrating how an embodiment may dynamically check availability of hardware resources for applications of virtual environments. For example, the embodiment may be implemented as a computer program product comprising a computer readable storage medium including instructions that, when executed by a processor attempt execution of an application in one of the virtual environments and determine whether specified hardware resources are available to execute the application in the virtual environment. Alternatively, the process of flowchart 400 may be implemented in hardware, such as in a state machine of an ASIC, such as ASIC 124 depicted in FIG. 1. For example, ASIC 124 may comprise a dynamic hardware verification module that works in conjunction with other hardware of system 100 to dynamically check availability of specified hardware resources.

As illustrated in FIG. 4, the process may involve storing data of a specified hardware resource in an application resource profile file (element 405). For example, operating system 112 may store or make a hardware data entry in a section of a configuration file for required or suggested hardware resources for an application of applications 111 at the time a user or system administrator installs the application in virtual environment 110.

System 100 may then execute one or more virtual environments and virtual I/O servers (element 410). For example, system 100 may start or continue the execution of virtual environment 110, any other virtual environments that system 100 may be hosting, and start or continue the execution of virtual I/O server 108. A user of system 100 may attempt to execute an application of applications 111 (element 415). Before system 100 actually executes any code of the application, system 100 may check the hardware data of the application resource profile file to determine what hardware resources are specified to execute the application (element 420). For example, operating system 112 may access a file named "vahw.cfg" that is stored in the "/etc/" subdirectory.

System 100 may then compare the hardware resources specified in the "vahw.cfg" file with the currently available hardware resources to determine whether the specified hardware resources are available (element 425). If the specified hardware resources are unavailable, system 100 may prevent the application from executing (element 430). If the specified hardware resources are available, system 100 may continue by enabling execution of the application (element 435) and monitoring for any changes to the hardware configuration (element 440).

If additional hardware resources are added to the system 100, or if one or more existing hardware resources are removed from system 100, system 100 may detect the addition or removal of the hardware resources (element 445) and continue by comparing the hardware resources specified in the "vahw.cfg" file with the currently available hardware resources to determine whether the specified hardware resources are available for one or more applications (element 420). If the specified hardware resources for one or more applications are unavailable, system 100 may prevent or even stop the applications from executing (element 430). If the all of the specified hardware resources are available (element 425), system 100 may return to enabling execution of the applications (element 435) and monitoring for any other changes to the hardware configuration (element 440).

When system 100 does not detect any changes to the hardware resources (element 445), system 100 may continue by monitoring for proposed hardware configuration changes (element 450). For example, system 100 may monitor a hardware management console coupled to system 100 for any attempted hardware configuration changes by a system administrator. In response to detecting that a hardware configuration change has been proposed, system 100 may determine whether the proposed hardware configuration change will result in one or more applications of applications 111 having insufficient hardware resources to execute (element 455).

For example, system 100 may compare the hardware resources specified in the "vahw.cfg" file with the proposed configuration changes to the hardware resources, determining how the resulting configuration of hardware resources compares to the specified hardware resources. Depending on whether the resulting configuration of hardware resources would affect the execution of one or more of the applications, system 100 may either prevent the proposed hardware configuration changes (element 460) or allow the proposed hardware configuration changes (element 465).

Flowchart 400 of FIG. 4 illustrates only one process. Alternative embodiments may implement innumerable variations of flowchart 400. For example, some alternative embodiments may not attempt execution of an application in a virtual environment (element 415) and check the application resource profile file (element 420) before determining whether specified hardware resources are currently available (element 425). In such embodiments, the system may not check for availability of hardware resources during startup of applications, but allow the applications to start and only check for dynamic changes of configuration to the hardware resources however the changes may come about. Other alternative embodiments may perform actions in addition to the actions illustrated in FIG. 4, while even further alternative embodiments may eliminate or avoid other steps.

Figure 5:
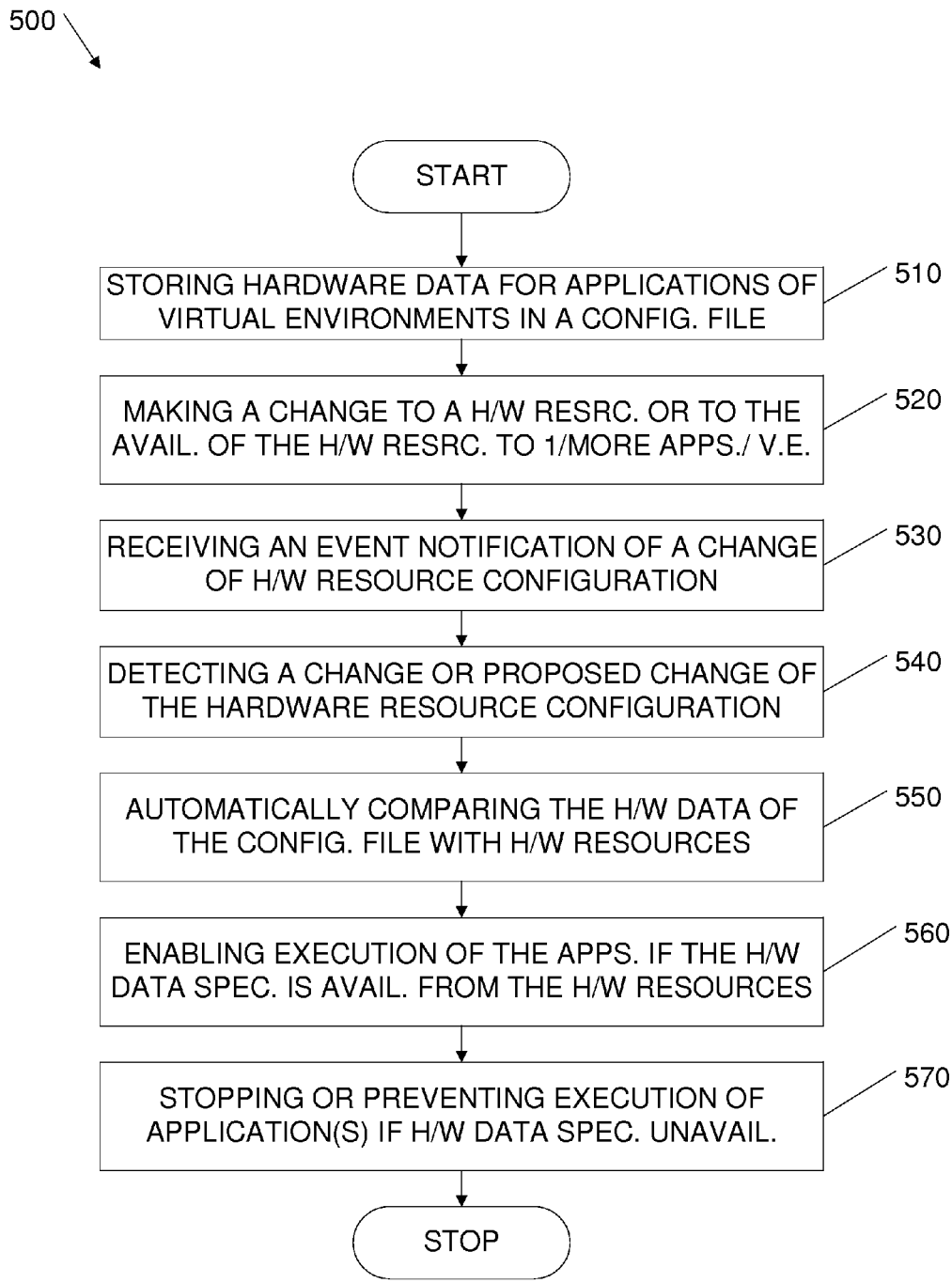
FIG. 5 illustrates a flowchart of a method for dynamically checking the availability of hardware resources for one or more applications of one or more virtual environments.

FIG. 5 illustrates a flowchart 500 of a method for dynamically checking availability of hardware resources for applications of virtual environments. For example, one or more embodiments of apparatus 310 shown in FIG. 3 may implement the method described by flowchart 500 by way of a collection of software or firmware instructions stored in volatile or nonvolatile memory.

As the system coupled to apparatus 310 operates, the system may store hardware data of virtual environments in a configuration file (element 510). For example, if apparatus 310 is coupled to the system comprising the elements of FIG. 2A, the system may store hardware data pertaining to applications 222 and applications 224. The stored hardware data may comprise, e.g., lists of hardware resources that the software vendors recommended or suggested to be available when executing the applications. Such hardware resources may comprise a recommended amount of RAM to execute instructions, a number of central processing units, a recommended amount of cache, and a number or amount of peripheral devices.

As the system coupled to apparatus 310 operates, the system may make a change to a hardware resource coupled with the system or, alternatively, a person may make a change to a hardware resource associated with a virtual environment. Further, the changed hardware resource may be specified as recommended hardware for one or more applications of the virtual environment (element 520). One detailed example, with reference to FIG. 1, may involve system 100 shutting down core 153 to conserve power. Another example may involve the removal of a USB device coupled with system 100 via USB adapter 164. Yet another example may involve a technician reconfiguring a number of virtual processing units available to virtual environment 110, wherein the change to the number of available virtual processing units corresponds to a hardware change in an amount of access to a physical processor or processor core.

Worth noting, the system may sense such change of configuration and update one or more files of the system. Continuing with one of the examples noted above, removal of the USB device previously coupled with system 100 via USB adapter 164 may involve inserting or removing hardware data of a file in the "/proc" subdirectory of system 100, such as removing text or setting a flag in the "/proc/bus/usb" file. Other example files that may be updated include files in the "/dev" directory, such as "/dev/ttyUSB1", or a file of the virtual file system (VFS), such as "USBFS", inserting or changing text in the "/etc/fstab" file, or updating a table in RAM.

Returning back to the system coupled to apparatus 310, as the system continues operation, apparatus 310 may receive an event notification alerting apparatus 310 to the fact that the hardware resource configuration has changed (element 530). For example, hardware resource monitor 330 may monitor a log file where records of changes are written, such as a process daemon checking an "eventlog" file. More specifically, a profile check daemon may monitor one or more logs, where records of hardware resource change events are written, and notify a client of apparatus 310 or system 100.

Alternatively, apparatus 310 may detect a change or proposed change of the hardware resources for system 100 (element 540). Dynamic change module 370 may comprise a hardware management console coupled to apparatus 310 that a system administrator may use to attempt a configuration of hardware resources for apparatus 310. For example, the system administrator may attempt to remove a SCSI hard drive resource for a virtual environment and replace the SCSI hard drive with a fibre channel SAN drive for data storage of the virtual environment. After the system administrator enters the proposed changes into dynamic change module 370, such as by editing one or more text configuration files, dynamic change module 370 may alert hardware resource monitor 330 to the proposed changes.

In response to detecting a change of configuration of a hardware resource, or being alerted to a proposed change, apparatus 310 may automatically compare the hardware data of the configuration file with the hardware resources that remain after the change or will remain after the proposed change (element 550). For example, apparatus 310 may examine the hardware data of hardware specification module 320 that describes the specified hardware resources for an application of a virtual environment controlled by virtual machine monitor 350. Apparatus 310 may compare the specified hardware resources for the application with the proposed or actual remaining hardware resources to determine whether the remaining hardware resources are sufficient or otherwise compatible with the specified hardware resources for the application.

An embodiment of flowchart 500 may continue by enabling execution of the application if the available or remaining hardware resources meet or exceed the requirements of the data of the specified hardware resources for the application (element 560). Alternatively, if apparatus 310 determines that the available or remaining hardware resources do not meet the requirements of the specified hardware resources apparatus 310 may stop or prevent execution of the application (element 570).

Another embodiment is implemented as a program product for implementing systems, methods, and apparatuses described with reference to FIGS. 1-5. Embodiments may contain both hardware and software elements. One embodiment may be implemented in software and include, but not limited to, firmware, resident software, microcode, etc.

Furthermore, embodiments may take the form of a computer program product accessible from a computer-usable or computer-readable medium providing program code for use by or in connection with a computer or any instruction execution system. For the purpose of describing the various embodiments, a computer-usable or computer readable medium may be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Figure 6A:
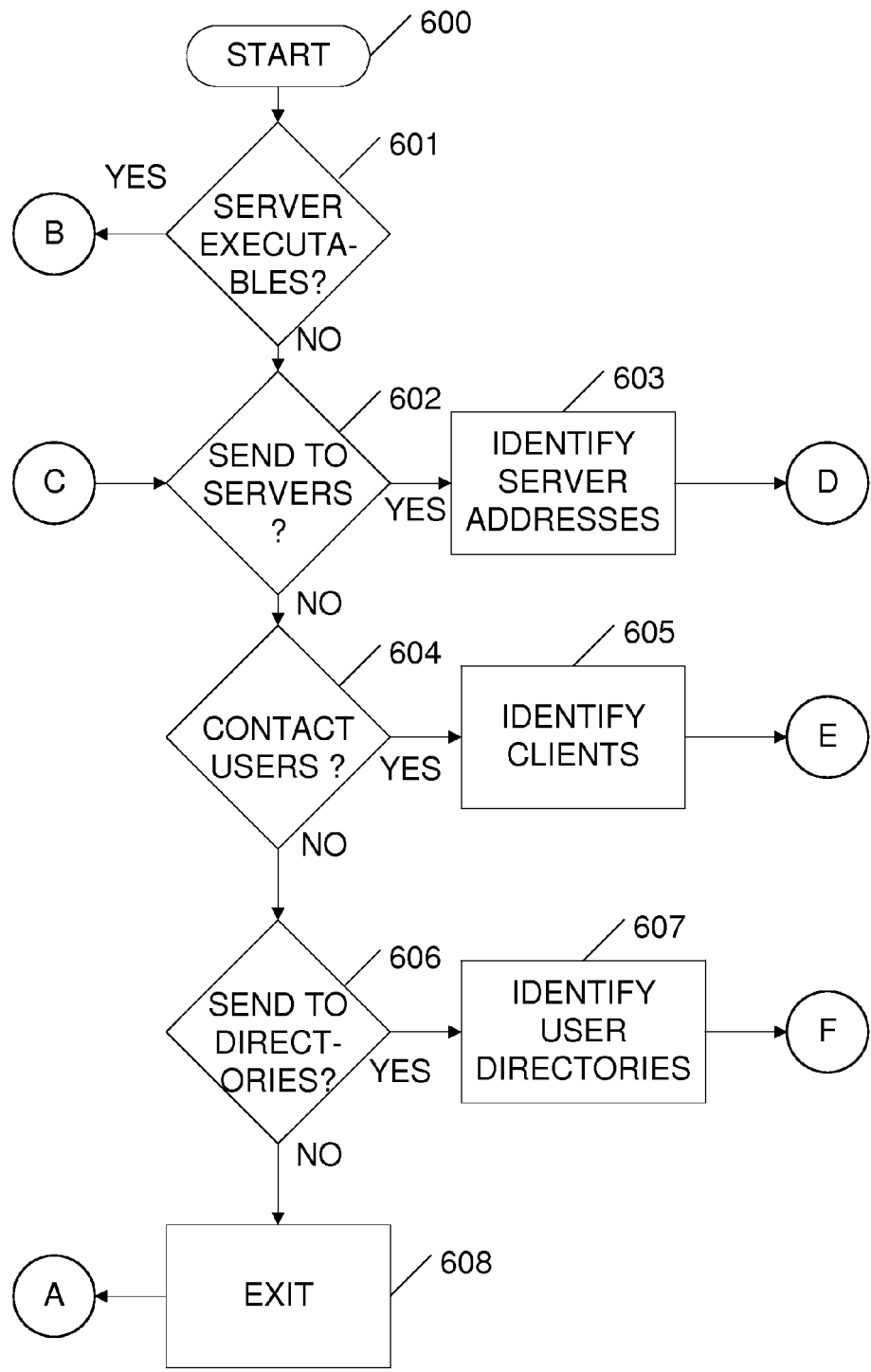
FIGS. 6A & 6B show a flowchart for deploying software that dynamically verifies availability of hardware resources for applications of virtual environments.
Figure 6B:
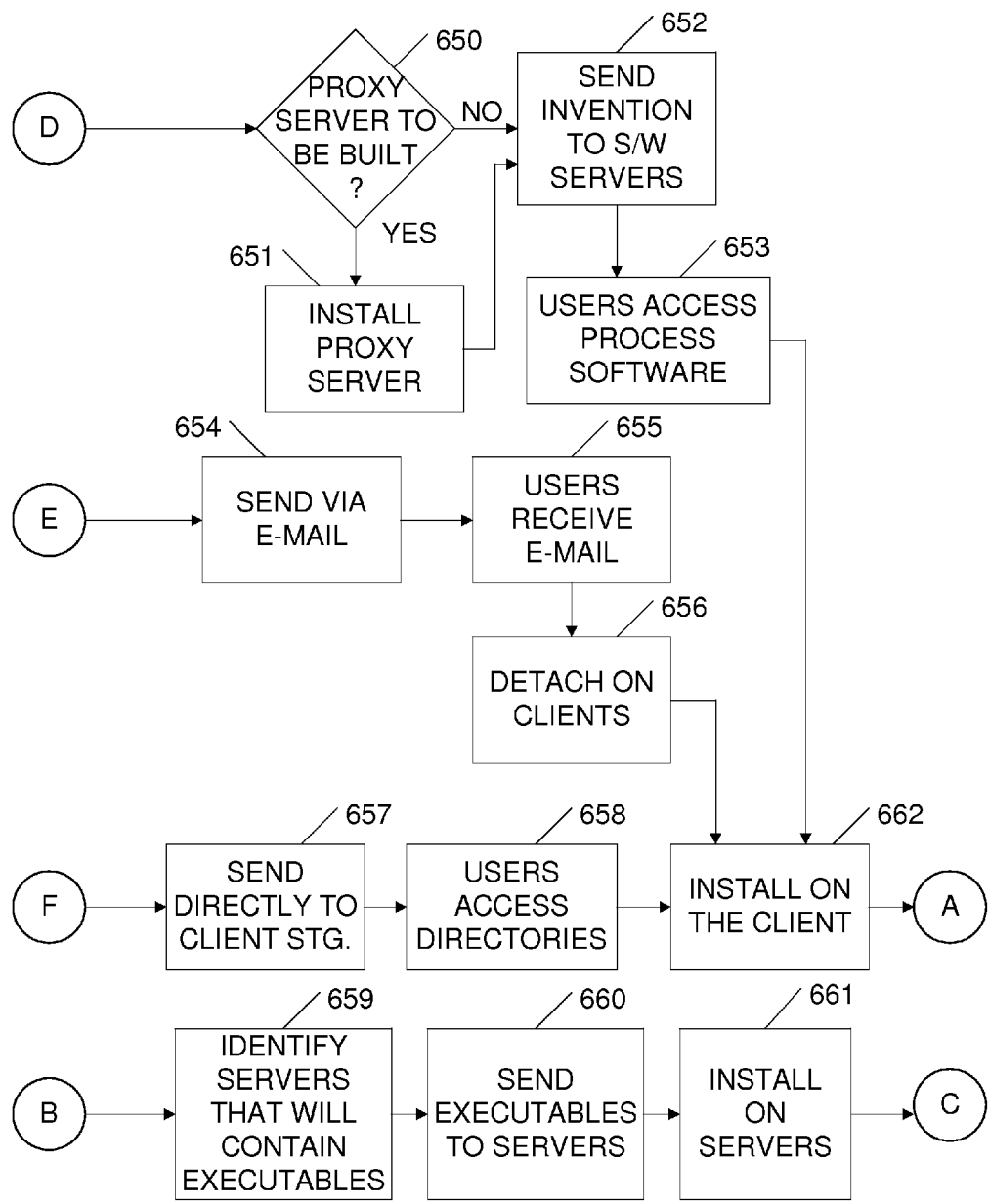

While it is understood that the process software to dynamically check for the availability of hardware resources for applications of virtual environments may be deployed by manually loading directly in the client, server, and proxy computers via loading a storage medium such as a CD, DVD, etc., the process software may also be automatically or semi-automatically deployed into a computer system by sending the process software to a central server or a group of central servers. The process software may then be downloaded into the client computers that will execute the process software. Alternatively the process software may be sent directly to the client system via e-mail. The process software may then be either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the code of the proxy servers, transmit the proxy server code, then install the proxy server code on the proxy computer. The process software will be transmitted to the proxy server then stored on the proxy server. FIGS. 6A and 6B show a flowchart for deploying software that dynamically verifies availability of hardware resources for applications of virtual environments.

Step 600 begins the deployment of the process software. The first thing is to determine if there are any programs that will reside on a server or servers when the process software is executed (element 601). If this is the case then the servers that will contain the executables are identified (element 659). The process software for the server or servers is transferred directly to storage of the server via FTP or some other protocol or by copying through the use of a shared file system (element 660). The process software is then installed on the servers (element 661). Next, a determination is made on whether the process software is to be deployed by having users access the process software on a server or servers (element 602). If the users are to access the process software on servers then the server addresses that will store the process software are identified (element 603). A determination is made if a proxy server is to be built (element 650) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (element 651). The process software is sent to the servers either via a protocol such as FTP or it is copied directly from the source files to the server files via file sharing (element 652). Another embodiment would be to send a transaction to the servers that contained the process software and have the server process the transaction, then receive and copy the process software to the file system of the server. Once the process software is stored at the servers, the users via their client computers, then access the process software on the servers and copy to their client computers file systems (element 653). Another embodiment is to have the servers automatically copy the process software to each client and then run the installation program for the process software at each client computer. The user executes the program that installs the process software on his client computer (element 662) then exits the process (element 608).

In step (element 604) a determination is made whether the process software is to be deployed by sending the process software to users via e-mail. The set of users where the process software will be deployed are identified together with the addresses of the user client computers (element 605). The process software is sent via e-mail to each of the users' client computers (element 654). The users then receive the e-mail (element 655) and then detach the process software from the e-mail to a directory on their client computers (element 656). The user executes the program that installs the process software on his client computer (element 662) then exits the process (element 608). Lastly a determination is made on whether to the process software will be sent directly to user directories on their client computers (element 606). If so, the user directories are identified (element 607). The process software is transferred directly to the user's client computer directory (element 657). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (element 658). The user executes the program that installs the process software on his client computer (element 662) then exits the process (element 608).

Process software, which consists of dynamically checking for the availability of hardware resources for applications of virtual environments, may be integrated into a client, server, and network environment by providing for the process software to coexist with applications, operating systems and network operating systems software and then installing the process software on the clients and servers in the environment where the process software will function. The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

Figure 7A:
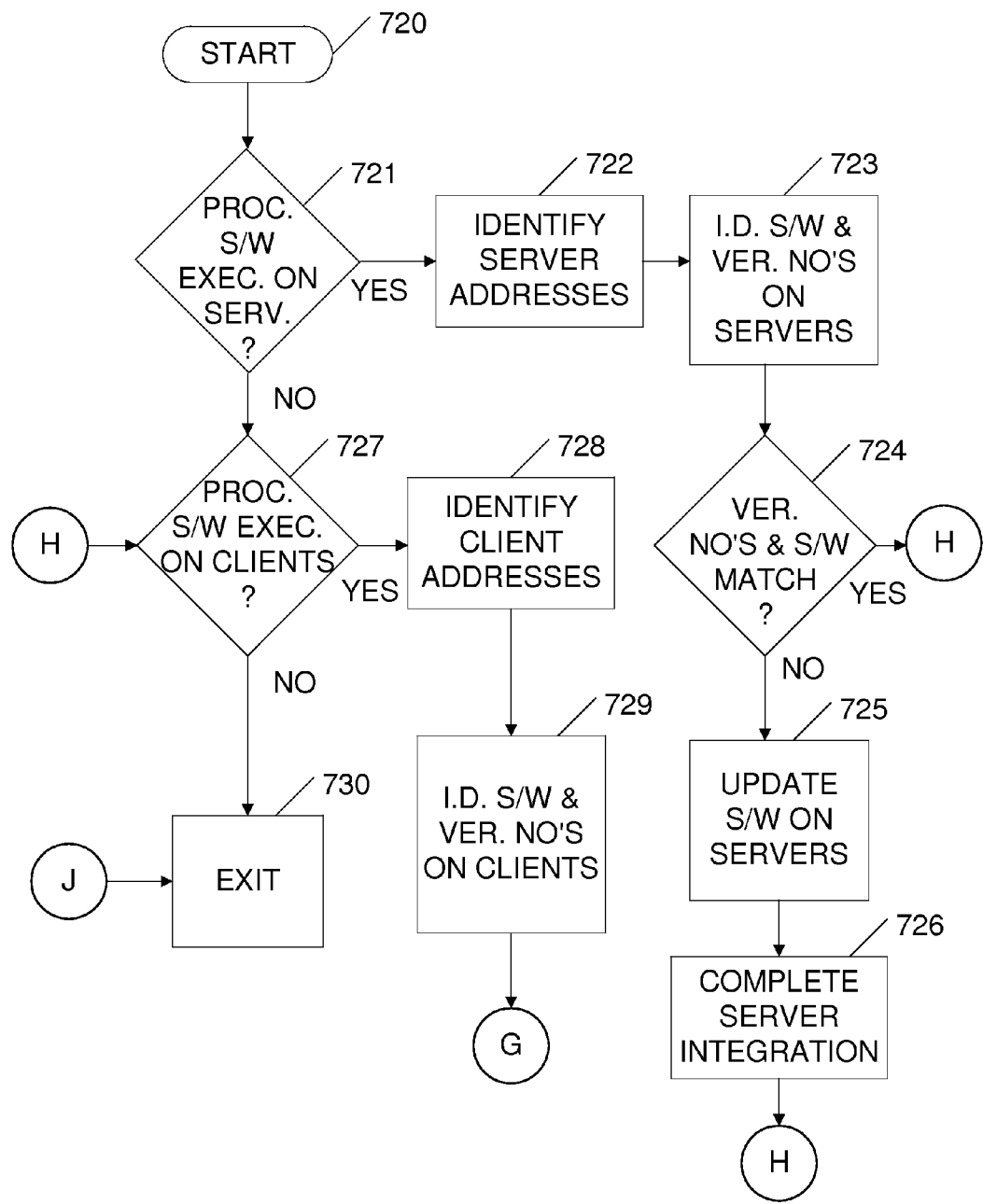
FIGS. 7A & 7B depict a flowchart for integrating software that dynamically verifies availability of hardware resources for applications of virtual environments into client, server, and network environments.
Figure 7B:
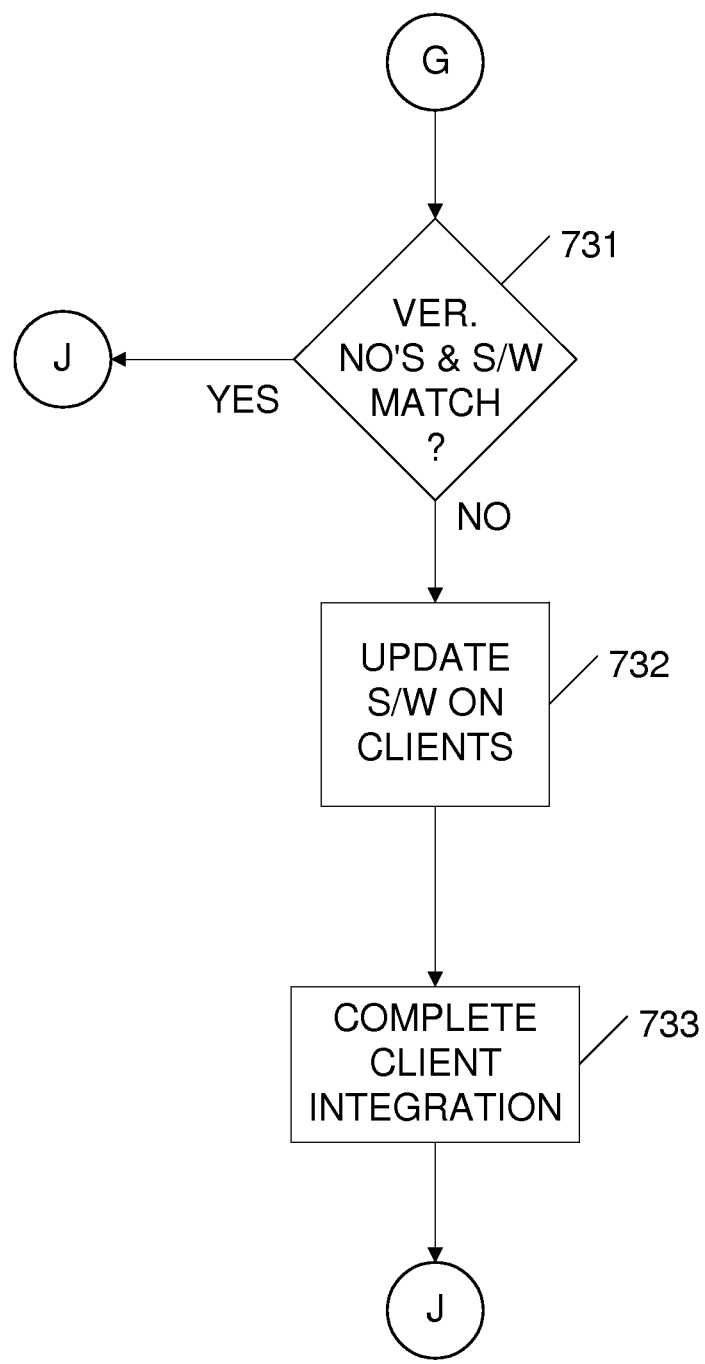

After ensuring that the software, where the process software is to be deployed, is at the correct version level that has been tested to work with the process software, the integration is completed by installing the process software on the clients and servers. FIGS. 7A and 7B depict a flowchart for integrating software that dynamically verifies availability of hardware resources for applications of virtual environments into client, server, and network environments.

Step (element 720) begins the integration of the process software. The first thing is to determine if there are any process software programs that will execute on a server or servers (element 721). If this is not the case, then integration proceeds to (element 727). If this is the case, then the server addresses are identified (element 722). The servers are checked to see if they contain software that includes the operating system (OS), applications, and network operating systems (NOS), together with their version numbers, which have been tested with the process software (element 723). The servers are also checked to determine if there is any missing software that is required by the process software (element 723). A determination is made if the version numbers match the version numbers of OS, applications and NOS that have been tested with the process software (element 724). If all of the versions match and there is no missing required software the integration continues in (element 727).

If one or more of the version numbers do not match, then the unmatched versions are updated on the server or servers with the correct versions (element 725). Additionally if there is missing required software, then it is updated on the server or servers (element 725). The server integration is completed by installing the process software (element 726). Element 727, which follows elements 721, 724, or 726, determines if there are any programs of the process software that will execute on the clients. If no process software programs execute on the clients the integration proceeds to 230 and exits. If this not the case, then the client addresses are identified (element 728). The clients are checked to see if they contain software that includes the operating system (OS), applications, and network operating systems (NOS), together with their version numbers, which have been tested with the process software (element 729). The clients are also checked to determine if there is any missing software that is required by the process software (element 729).

A determination is made is the version numbers match the version numbers of OS, applications and NOS that have been tested with the process software (element 731). If all of the versions match and there is no missing required software, then the integration proceeds to element 730 and exits. If one or more of the version numbers do not match, then the unmatched versions are updated on the clients with the correct versions (element 732). In addition, if there is missing required software then it is updated on the clients (element 732). The client integration is completed by installing the process software on the clients (element 733). The integration proceeds to element 730 and exits.

Those skilled in the art, having the benefit of this disclosure, will realize that the present disclosure contemplates dynamically checking availability of hardware resources for applications of virtual environments. The form of the embodiments shown and described in the detailed description and the drawings should be taken merely as examples. The following claims are intended to be interpreted broadly to embrace all variations of the example embodiments disclosed.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   responsive to tracking usage of hardware resources by an application executing in a virtual environment, generating hardware data comprising a minimum amount of a hardware resource required to enable execution of the application in the virtual environment;
   responsive to determining the minimum amount of hardware resource being available to the application in the virtual environment, executing the application within the virtual environment;
   responsive to detecting a change of hardware configuration of the virtual environment, comparing, via a computing device, the hardware data with hardware resources allocated to the virtual environment, wherein the comparing is to determine availability of the minimum amount of the hardware resource as a result of the change of the hardware configuration of the virtual environment; and
   disabling execution of the application in response to the comparing resulting in determining the minimum amount of the hardware resource is not available to the application in the virtual environment.

2. The method of claim 1, further comprising:
   detecting the change of hardware configuration, wherein the detecting comprises sensing a hot swapping of a hardware device.

3. The method of claim 1, further comprising:
   detecting the change of hardware configuration, wherein the detection comprises checking for a dynamic change of a logical partition of the virtual environment.

4. The method of claim 3, wherein the detecting the change comprises detecting relocation of the logical partition from a first server to a second server.

5. The method of claim 3, wherein the detecting the change comprises detecting dynamic reallocation of a host bus adapter from the logical partition to another logical partition, wherein further the reallocation of the host bus adapter is via a multipath I/O module.

6. The method of claim 1, further comprising:
   initiating execution of the application in response to the comparing, wherein the comparing comprises determining the minimum amount of the hardware resource will be available to the application in the virtual environment.

7. The method of claim 1, further comprising:
   receiving an event notification in response to the change of configuration and checking availabilities of hardware resources for multiple applications in response to the receiving the event notification.

8. The method of claim 1, wherein the comparing the hardware data with hardware resources comprises checking, via a profile check daemon, a section of a configuration file with a list of hardware resources, wherein further the configuration file comprises a file stored in an "/etc" directory and the list of hardware resources comprises at least one file in a "/dev" directory.

9. An apparatus, comprising:
   a hardware specification module to generate hardware data comprising a minimum, amount of a hardware resource required to enable an application of a virtual environment responsive to tracking usage of hardware resources by the application executing in the virtual environment;
   a hardware resource monitor to monitor for changes of configuration to hardware resources of the virtual environment; and
   an execution control module to control execution of the application, wherein the execution control module is configured to enable execution of the application within the virtual environment responsive to determining the minimum amount of hardware resource being available to the application in the virtual environment and to disable execution of the application in response to the hardware resource monitor detecting that a change of configuration to hardware resources results in the minimum amount of the hardware resource not being available to the application in the virtual environment.

10. The apparatus of claim 9, further comprising a virtual machine monitor to enable multiple virtual environments to access the hardware resources, wherein the hardware resource monitor comprises a profile check daemon.

11. The apparatus of claim 9, further comprising a dynamic change module to enable a system administrator to make a dynamic change to the configuration of the hardware resources.

12. The apparatus of claim 11, wherein the dynamic change comprises one of a reallocation of an amount of memory for the virtual environment, a reallocation of a storage device for the virtual environment, a reallocation of an amount of processing capability for the virtual environment, and reallocation of a network communication device for the virtual environment.

13. A computer program product comprising:
a computer readable storage medium including instructions that, when executed by a processor:
responsive to tracking usage of hardware resources by an application executing in a virtual environment, generate hardware data comprising a minimum amount of a hardware resource required to enable execution of the application in the virtual environment;
responsive to determining the minimum amount of hardware resource being available to the application in the virtual environment, execute the application within the virtual environment;
responsive to detecting a change of hardware configuration of the virtual environment, compare the hardware data with a current configuration of hardware resources allocated to the virtual environment, wherein the comparing is to determine availability of the minimum amount of the hardware resource as a result of the change of the configuration of hardware resources; and
disable execution of the application in response to the comparison resulting in determining the minimum amount of the hardware resource is not available to the application in the virtual environment.

14. The computer program product of claim 13, further comprising instructions that detect changes of the configuration of hardware resources.

15. The computer program product of claim 14, further comprising instructions that provide an error message to a user of the computing device to inform the user of a change of the configuration.

16. The computer program product of claim 14, wherein the instructions that detect the changes of the configuration comprise instructions that receive an event notification via a profile check daemon.

17. The computer program product of claim 13, further comprising instructions that detect proposed changes of the virtual environment that will affect availability of a hardware resource of the hardware data.

18. The computer program product of claim 17, further comprising instructions that inform a user of the computing device that the proposed change will result in insufficient hardware resources to execute the application.

19. The computer program product of claim 18, further comprising instructions that prevent implementation of the proposed change.

20. The computer program product of claim 13, further comprising instructions that dynamically monitor execution of the application for access of hardware resources and dynamically update the hardware data based on the accessed hardware resources.

21. The computer program product of claim 13, wherein the instructions that receive hardware data comprise instructions that read an application profile file, wherein further the application profile file comprises hardware data which enable the execution of multiple applications of the virtual environment.

22. The computer program product of claim 13, wherein the instructions that receive hardware data comprise instructions that read an application profile file, wherein further the application profile file comprises hardware data only for the application.

23. A method for deploying computing infrastructure, comprising integrating a computer program product into a computing system, wherein the computer program product comprises instructions that, when executed by a processor:
responsive to tracking usage of hardware resources by an application executing in a virtual environment, generate hardware data comprising a minimum amount of a hardware resource required to enable execution of the application in the virtual environment;
responsive to determining the minimum amount of hardware resource being available to the application in the virtual environment, execute the application within the virtual environment;
responsive to detecting a change of hardware configuration of the virtual environment, compare the hardware data with a current configuration of hardware resources allocated to the virtual environment, wherein the comparing is to determine availability of the minimum amount of the hardware resource as a result of the change of the configuration of hardware resources; and
disable execution of the application in response to the comparison resulting in determining the minimum amount of the hardware resource is not available to the application in the virtual environment.

* * * * *